US012326768B1

(12) United States Patent
Jeter et al.

(10) Patent No.: US 12,326,768 B1
(45) Date of Patent: Jun. 10, 2025

(54) MEMORY CALIBRATION IN LIMITED POWER SCENARIO

(71) Applicant: Apple Inc., Cupertino, CA (US)

(72) Inventors: Robert E. Jeter, Santa Clara, CA (US); Jingkui Zheng, Sunnyvale, CA (US); Yi Chun Chen, San Jose, CA (US)

(73) Assignee: Apple Inc., Cupertino, CA (US)

( * ) Notice: Subject to any disclaimer, the term of this patent is extended or adjusted under 35 U.S.C. 154(b) by 162 days.

(21) Appl. No.: 18/053,684

(22) Filed: Nov. 8, 2022

Related U.S. Application Data

(60) Provisional application No. 63/376,363, filed on Sep. 20, 2022.

(51) Int. Cl.
*G06F 3/06* (2006.01)
*G06F 1/26* (2006.01)

(52) U.S. Cl.
CPC .............. *G06F 1/26* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2009/0161453 A1* | 6/2009 | Giovannini | G06F 13/1689 365/194 |
| 2011/0154005 A1 | 6/2011 | Landry et al. | |
| 2015/0287356 A1* | 10/2015 | Chaji | G09G 3/3208 345/212 |
| 2017/0351317 A1* | 12/2017 | Tan | H04W 52/0296 |
| 2019/0354313 A1* | 11/2019 | Sheperek | G11C 29/028 |
| 2020/0120375 A1* | 4/2020 | Hamon | H04N 21/4627 |
| 2020/0285406 A1* | 9/2020 | Notani | G11C 11/4074 |
| 2020/0301492 A1 | 9/2020 | Regupathy et al. | |
| 2021/0183414 A1 | 6/2021 | Jeter et al. | |

* cited by examiner

*Primary Examiner* — Paul Yen
(74) *Attorney, Agent, or Firm* — Kowert, Hood, Munyon, Rankin & Goetzel, P.C.; Dean M. Munyon

(57) ABSTRACT

The present disclosure is directed to a computing device in which memory calibrations may be modified based on an energy budget. A computing device is configured to operate using energy provided from at least one energy source. The computing device includes a memory and a memory controller coupled to the memory. The memory controller includes a calibration circuit configured to perform a memory calibration. The computing device further includes an energy detection circuit configured to detect and indicate an amount of energy available to the computing device. The memory controller is configured to, based on the amount of energy available to the computing device and a specified energy limit, modify a resolution of the memory calibration such that the memory calibration consumes less energy than the specified energy limit.

20 Claims, 12 Drawing Sheets

MEMORY CALIBRATION IN LIMITED POWER SCENARIO

PRIORITY CLAIM

The present application claims priority to U.S. Provisional App. No. 63/376,363, entitled "Memory Calibration in Limited Power Scenario," filed Sep. 20, 2022, the disclosure of which is incorporated by reference herein in its entirety.

BACKGROUND

Technical Field

This disclosure is directed to memory subsystems, and more particularly, calibrations performed in memory subsystems.

Description of the Related Art

Eye patterns, or eye diagrams, are graphic illustrations that illustrate times and amplitudes at which a digital signal can be sampled at its correct value. In various types of systems that include data transmissions, it is desirable to sample signals (e.g., data signals synchronized by a clock signal) near a center of an eye, in terms of time and sampling voltage. In terms of timing, this can provide a signal with a sufficient amount of both setup and hold time, while also rendering it less susceptible to noise. In terms of voltage, this can enable a more accurate determination of a logic value (e.g., logic 1 or logic 0) based on a reference voltage used to distinguish one from the other.

In memory subsystems, calibrations may be performed to determine the points at which signals are sampled within the eye pattern. Calibrations are performed to determine an eye diagram that enables accurate sampling of signals, and thus include calibrations based both on the timing (sometimes referred to as a horizontal calibration) and sampling reference voltage (sometimes referred to as a vertical calibration). Performing these calibrations typically includes adjusting a number of different parameters that govern transmission of data between a memory controller and a memory. These parameters include a delay applied to a data strobe signal during the horizontal calibrations. A vertical calibration may include a number of horizontal calibrations performed at different reference voltages. Such calibrations may be performed during a system startup, and may also be performed on a periodic basis thereafter. Calibrations may also be performed in response to changes of a performance state.

SUMMARY

A memory calibration routine in a limited power scenario is disclosed. In one embodiment, a portable computing device includes a battery and is configured to receive power through an external connection. The portable computing device includes a memory and a memory controller coupled thereto, the memory controller having a calibration circuit configured to perform one or more memory calibrations during a boot-up routine of the portable computing device. The portable computing device further includes a charge detection circuit configured to determine a charge state of the battery (e.g., where the charge state indicates whether the battery is fully charged, fully discharged, or at some level there between). The memory controller is configured to, during the boot-up routine when the portable computing device is receiving power through the external connection and in response the charge detection circuit determining that the charge state of the battery is less than a specified amount, modify a resolution of one or more of the memory calibrations performed during the boot-up routine.

The disclosure further contemplates a computing device in which memory calibrations may be modified based on an energy budget. In one embodiment, a computing device is configured to operate using energy provided from at least one energy source. The computing device includes a memory and a memory controller coupled to the memory. The memory controller includes a calibration circuit configured to perform a memory calibration (e.g., of a data strobe to data signal delay). The computing device further includes an energy detection circuit configured to detect and indicate an amount of energy available to the computing device. The memory controller is configured to, based on the amount of energy available to the computing device and a specified energy limit, modify a resolution of the memory calibration such that the memory calibration consumes less energy than the specified energy limit.

BRIEF DESCRIPTION OF THE DRAWINGS

The following detailed description makes reference to the accompanying drawings, which are now briefly described.

DETAILED DESCRIPTION OF EMBODIMENTS

Figure 1A:
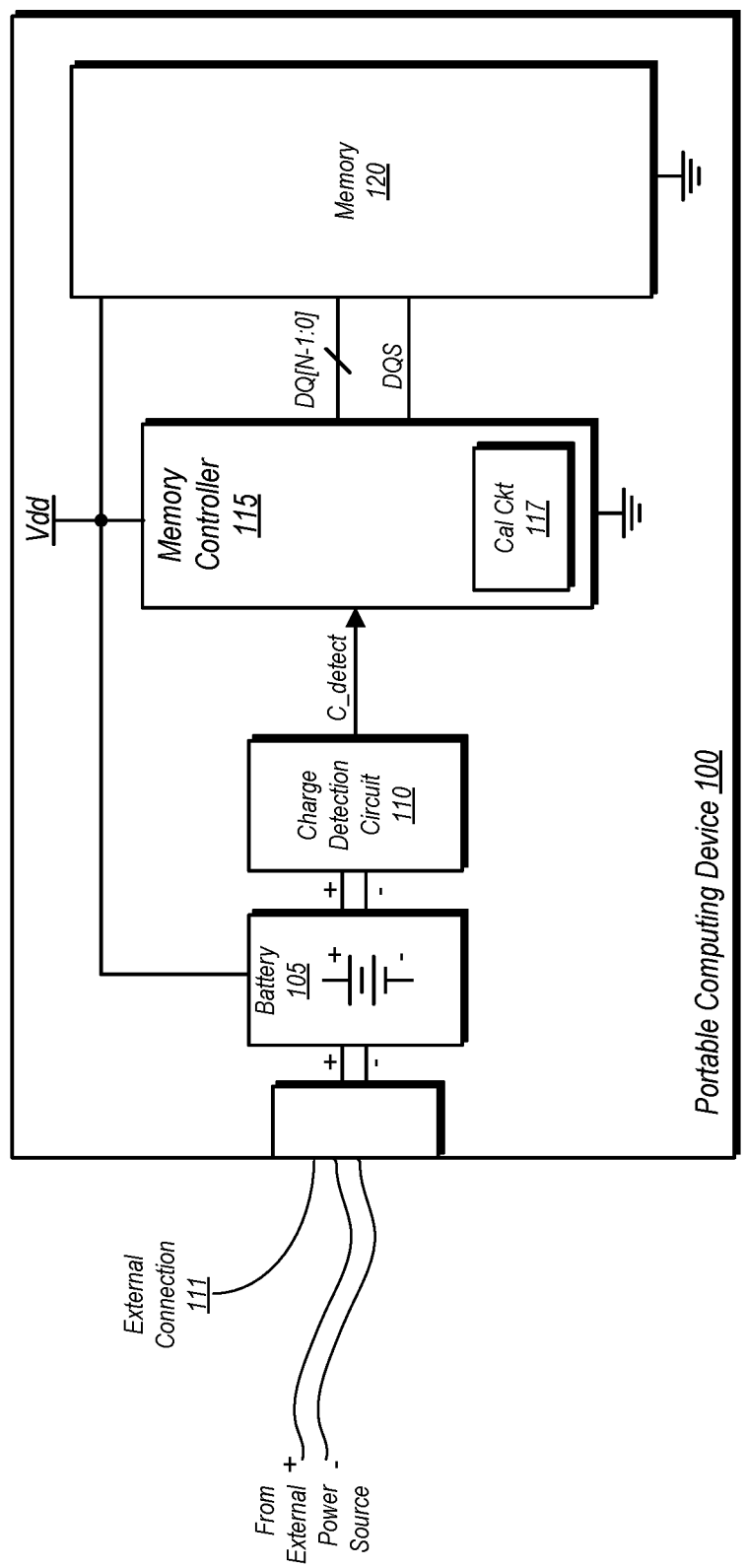
FIG. 1A is a block diagram of one embodiment of a portable computing device.

The present disclosure is directed to various methods for performing memory calibrations in a computing system when available energy is limited. In various computing systems, memory calibrations are performed to ensure proper setup and hold time for signals transferred between a memory and a memory controller. In some situations, memory calibrations may be performed at times when energy is limited. For example, during a cold boot of a portable computing device, when its battery is fully discharged, memory calibrations may be performed using power from an external source while the battery begins charging. However, the external source may have power limits, and these power limits can be exceeded by certain calibrations. If the battery has not sufficiently charged and the external source power limits have been exceeded, the portable computing device may suffer a brownout, and thus the boot process may be restarted. This can occur a number of times until the battery is sufficiently charged.

The present disclosure utilizes the insight provided by this problem to provide various methods for performing memory calibrations in scenarios where energy is limited. In various embodiments, a memory controller may cause one or more modifications of a memory calibration that is to be performed in a limited energy situation. Some modifications may change the resolution of a memory calibration, e.g., by changing the step size of a calibration or changing the number of bits used to carry out the calibrations. Other modifications are also possible and contemplated, such as delaying the onset of a calibration, or performing a calibration in segments with delays between the segments. For calibrations performed in multi-rank (e.g., dual-rank) memory systems where multiple memories share a bus, delays may be inserted between the calibrations of the various ranks. In systems having multiple memory channels, calibrations may be performed on a subset of the channels and/or with a delay between calibrations performed in the various channels. It is noted that the various methods disclosed herein are not exclusive of one another, and thus embodiments that combine two or more of these methods in a given calibration are possible and contemplated. By performing such methods, calibrations may be carried out within a given energy budget. In situations such as the cold boot situation discussed above, a battery may be allowed to charge more fully while brownouts and subsequent reboots of the system are prevented.

Thus, the present disclosure contemplates a system that includes a computing device having a memory and a memory controller and is configured to operate using at least one energy source. The system further includes an energy detection circuit configured to determine an amount of energy available to the system. The memory controller is configured to, based on the amount of energy available to the system and a specified energy limit, modify a memory calibration (e.g., by modifying its resolution) such that the calibration consumes less energy than the specified energy limit.

Various embodiments are now discussed in further detail. The discussion begins with various apparatus embodiments. An embodiment of a memory controller is then described. Graphic illustrations illustrating various aspects of calibrations carried out in various embodiments of a computing system are then described. The discussion continues with of a number of different methods for modifying calibrations in limited energy scenarios, via accompanying flow diagrams. The disclosure concludes with a description of an example system that can include embodiments of a memory subsystem as described elsewhere herein.

Computing Device Embodiments:

FIG. 1A is a block diagram of one embodiment of a portable computing system. In the embodiment shown, portable computing device 100 includes an external connection 111 that enables it to receive power from an external source. Additionally, portable computing device 100 also includes a re-chargeable battery which may provide power for operations by other circuitry therein. When receiving power from an external power source, battery 105 may be charged. However, when fully discharged, portable computing device 100 may be able to carry out at least some operations utilizing power received from the external source. A charge detection circuit 110 is provided to detect a charge state of battery 105. In one embodiment, charge detection circuit may determine the charge state of battery 105 based on a voltage across the battery, which declines as battery 105 discharges.

Although not explicitly shown here for the sake of simplicity, portable computing device 100 may have a number of other circuits not depicted in the drawing. These circuits may include various processor cores, other memories (e.g., cache memories, various buffers, etc.), graphics processing units, communications circuits (e.g., radio frequency circuits for cellular communications) and so on. Portable computing device 100 may also include one or more voltage regulators configured to regulate supply voltages provided to the various other circuits, such as memory controller 115. Although not explicitly shown here, the output of battery 105 may be provided to one or more voltage regulator circuits coupled between the battery and the various circuits that act as loads. These voltage regulator circuits may generate regulated supply voltages that are distributed to various ones of the circuits in portable computing device 100. Portable computing device 100 may also include one or more circuits for generating clock signals that are distributed to various synchronous circuits implemented therein. Power management circuitry may be provided to monitor various telemetry received from other circuits in portable computing device 100, and may adjust the various supply voltages and frequencies of clock signals to conserve power and optimize a power-to-performance ratio. Portable computing device 100 may also include one or more system-on-a-chip (SoC) circuits, upon which at least some of the circuits discussed here may be implemented.

Portable computing device 100 in the embodiment shown includes a memory controller 115 and a memory 120. Memory controller 115 includes a calibration circuit 117 that is configured to carry out various calibrations within the memory subsystem that includes memory 120. These calibrations include calibrating a delay applied to the data strobe signal, DQS, relative to the data signals, DQ[N−1:0]. Calibrations to determine a reference voltage at which signals are distinguished between logic values may also be performed. Additional calibrations may be carried out with respect to the transfer of other signals, such as address and control signals conveyed between memory controller 115 and memory 120. The various calibrations carried out by calibration circuit 117 may occur at various times, such as periodically during operation, as well as during a boot-up (start-up) of portable computing device 100. In various embodiments, components of portable computing device 100 such as memory controller 115 and memory 120 may operate in various ones of a number of different performance states. A performance state is defined herein as a unique combination of an operating voltage and a clock frequency at which a given circuit operates at a given time. Some performance states may be optimized for low power consumption (e.g., with lower clock frequencies and lower voltages) while other performance states may be optimized for higher performance (e.g., with higher voltages and higher clock frequencies).

As noted above, battery 105 may at times be discharged to an extent such that, by itself, it is incapable of providing sufficient power support to operation of circuits in portable computing device 100, including memory controller 115 and memory 120. These operations may include calibration operations carried out by calibration circuit 117. Accordingly, memory controller 115 in the embodiment shown is coupled to receive a charge detect signal, C_detect, indicative of a charge state of the battery at a given time. Based on the charge state indicated by the C_detect signal, calibration operations may be modified.

In various situations, when the battery is substantially discharged, portable computing device 100 may operate primarily on power received from the external power source. For example, if portable computing device 100 is a smartphone with an indication that its battery is discharged, it may be unable to operate in the absence of power received via external connection 111. If no external power is provided in such a situation, portable computing device 100 may shut down. Upon receiving power from an external source through external connection 111, portable computing device 100 may begin a boot-up procedure while, concurrently, battery 105 may begin charging. This is defined herein as a cold boot, or cold boot-up procedure. During the time that battery 105 is charging, the amount of available power may be limited until the charge state has reached a sufficient level. In particular, the power provided by an external source may be a relatively small amount, some of which is dedicated to transferring charge to battery 105 itself. Accordingly, some operations carried out in portable computing device 100 may be power limited when a cold boot is performed.

During a cold boot, if operations occur that would consume more power than a specified amount, a portable computing device 100 may suffer a brownout, thereby causing the boot-up procedure to be restarted. Calibrations carried out by calibration circuit 117 are among the operations that may be carried out during a boot-up procedure, including during a cold boot. Accordingly, memory controller 115 may, in a power limited situation such as a cold boot, cause one or more modifications to the calibrations in order to keep them within a specified power limit. For example, a resolution of a calibration procedure may be modified during a cold boot to allow the calibrations to be carried out while limiting their power consumption.

In the embodiment shown, memory controller 115 may receive from charge detection circuit 110 an indication, C_detect, of a charge state of battery 105. If the charge state is below some specified level (as during the cold boot situation described herein), memory controller 115 may cause modifications of the calibrations as noted above. Such modifications can include changing (e.g., increasing) a calibration step size or reducing the number of bits used in the calibration. These types of modifications change the resolution of the calibration in a manner to cause less power to be consumed as they are carried out.

Other modifications are also possible and contemplated. For example, the onset of some calibrations may be delayed until the charge state of battery 105 has reached a certain level. In instances wherein memory controller 115 and memory 120 may operate in different performance states, the performance of calibrations may be ordered such that those that consume the least amount of power (e.g., in lower voltage, lower frequency performance states) are performed before those that consume a greater amount of power (e.g., higher voltage, higher frequency performance states). The disclosure also contemplates performing calibrations in segments with delays between the segments. A segment is defined as a portion of a calibration, with the calibration considered fully performed when all segments have been completed. Embodiments of a memory subsystem in which the memory is arranged in ranks (e.g., where multiple ranks share a common data bus) are also possible and contemplated, and in such embodiments the calibrations may be conducted by rank with delays inserted between calibrations of the different ranks. In embodiments of a memory subsystem having multiple channels, calibrations may be conducted on a channel-by-channel basis, with delays between calibrations of the different channels. Calibrating only a subset of the memory channels during a limited energy scenario is also possible and contemplated for multi-channel memory subsystems.

Figure 1B:
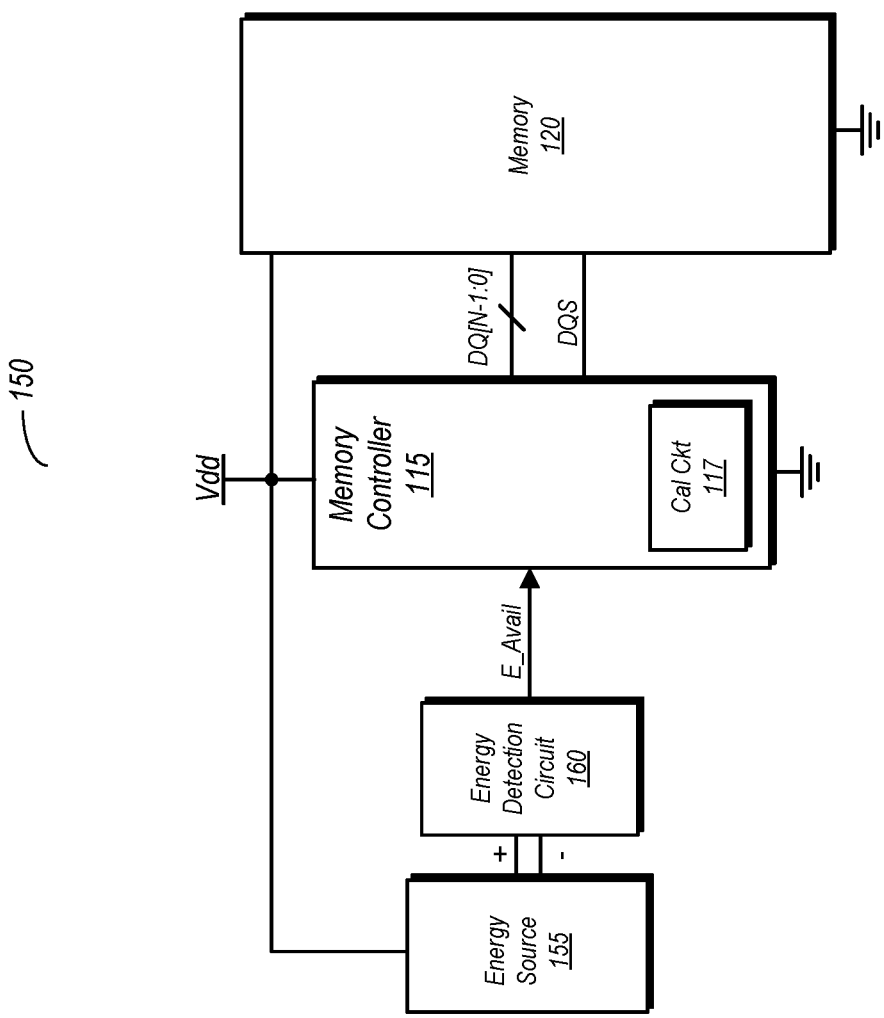
FIG. 1B is a diagram of one embodiment of a computing device including a memory and a memory controller.

FIG. 1B is block diagram of another embodiment of a computing device. In the embodiment shown, computing device 150 includes a memory controller 115 and a memory 120, similar to the embodiment of portable computing system 100 discussed above. Computing device 150 also includes an energy source 155 and an energy detection circuit 160. Although not explicitly shown here, computing device 150 may include a number of other circuits as well, including processor cores, graphics processors, input/output (I/O) circuits, various voltage regulators and power distribution circuits (which may be coupled between energy source 155 and respective loads), power management circuitry, clock generation circuitry, and so on.

Generally speaking, energy source 155 may comprise one or more sources of energy upon which computing device 150 may operate, including a battery and/or external power. Energy detection circuit 160 may be any type of circuitry capable of detecting an amount of energy that is available to computing device 150. A signal indicative of the amount of available energy, E_Avail, is provided to memory controller 115, and may be provided to other circuits in computing device 150 as well. In indicating the amount of energy available to various circuits in the system, energy detection circuit 160 may provide values corresponding to a voltage, to available current, available power, or any other parameter that corresponds to an amount of available energy. In one embodiment, the amount of energy available to computing device 150 may include the total available energy from all energy sources, e.g., the combined energy of an internal battery and energy provided from an external energy source.

In some embodiments, computing device 150 may be a portable device that can operate on a battery when not connected to any external power source. However, embodiments are possible and contemplated in which computing device is not a portable device.

Memory controller 115 of computing device 150 includes a calibration circuit 117 which is configured to carry out the various types of memory calibrations discussed elsewhere. However, at times, the amount of energy available to computing device 150 may be limited, e.g., to a battery that has been substantially discharged. Accordingly, in limited energy situations (including, but not limited to, the cold boot described above), memory controller 115, and in particular, calibration circuit 117 may perform various memory calibrations with modifications relative to the manner in which they may be normally carried out. These modifications may include changing a calibration resolution (e.g., changing a calibration step size and/or number of bits used in the calibration), delaying the onset of at least some calibrations, performing calibrations in segments (with delays between each segment), and performing the calibrations that consume more power later than those that consume less (e.g., in the case where a battery is charging concurrent with performing the various calibrations, performing calibrations on a subset of memory channels (in multi-channel memory subsystems), and so on. The calibrations may thus be carried out in a manner to consume less energy than some specified energy limit. The limit may be based on both the amount of energy available to the various components of computing device, as well as energy that may be required by other components outside of the memory subsystem. Generally speaking, the calibrations may be carried out by calibration circuit in limited energy situations in accordance with an energy budget, as specified by some particular limit.

In various embodiments, the energy limit may be a power limit, where power is energy consumed per a unit of time. Accordingly, the calibrations may be carried out such that they consume power that is less than the specified power limit.

Figure 2:
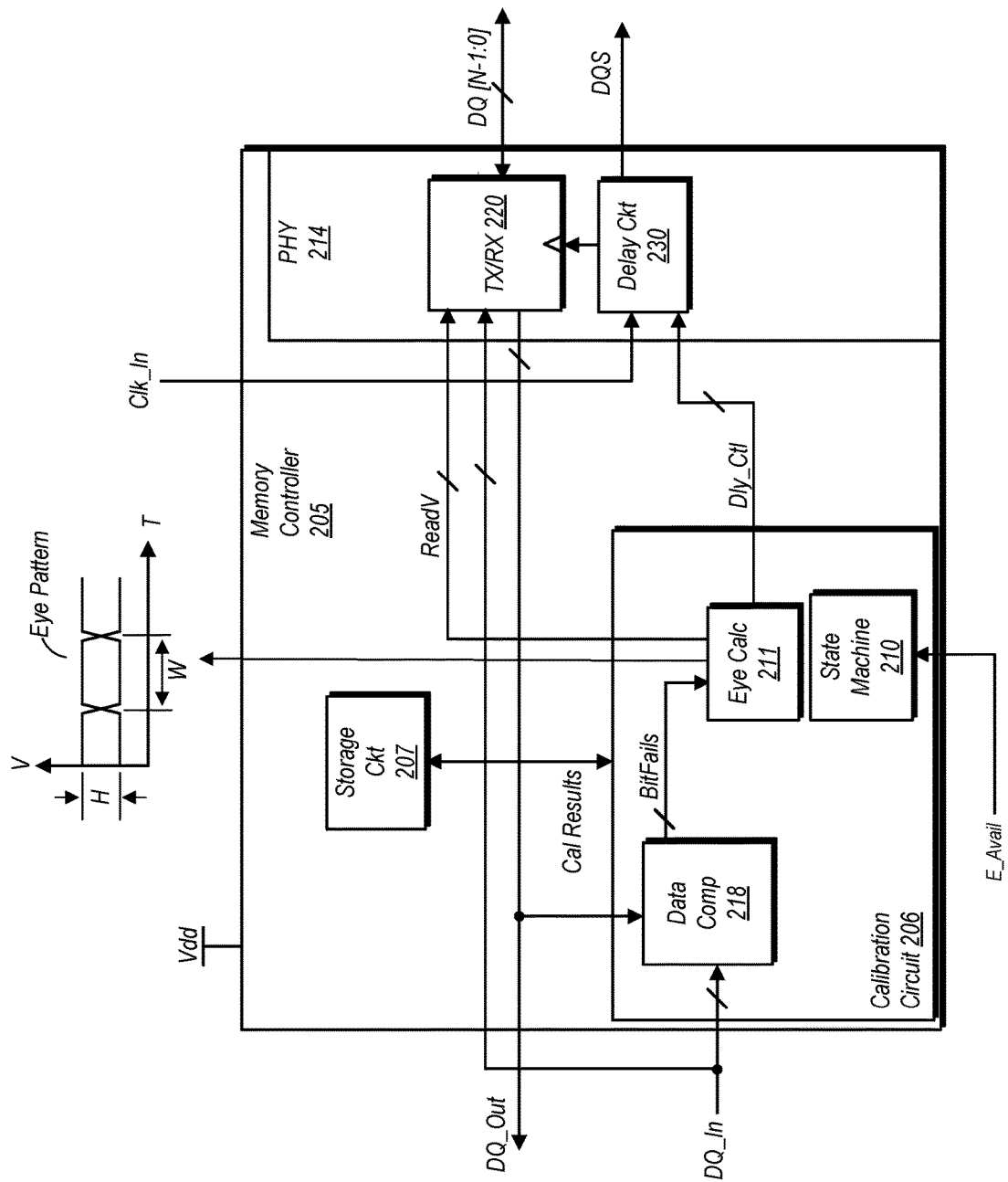
FIG. 2 is a block diagram of one embodiment of a memory controller.

Memory Controller Embodiment:

FIG. 2 is a block diagram of one embodiment of a memory controller. In the embodiment shown, memory controller 205 includes a calibration control circuit 206 and a physical interface 214. Calibration control circuit 206 in the embodiment shown implements various circuit units, including data comparator 218, eye calculator 211, and a state machine 210. Physical interface 214 implements circuitry for communicating with a memory (not shown here). The circuitry of physical interface 214 includes transceiver 220 and a delay circuit 230. Data to be written to memory may be received by memory controller via the DQ_In signal path. Data read from memory may be conveyed to a requestor via the DQ_Out data bus. Memory controller 205 is configured to operate based on a received supply voltage Vdd, and using an input clock signal, Clk_In. Both the values of the voltage and a frequency of the clock signal may be varied during operation.

In the embodiment shown, transceiver 220 of physical interface 214 is coupled to a data bus which includes data signal paths DQ[N-1:0]. Additionally, physical interface 214 includes a delay circuit 230 from which a data strobe signal, DQS, is generated (based on the variable frequency clock signal, Clk_In) and conveyed to the memory in order to synchronize transfers of data. Although only a single data strobe signal is shown here, some embodiments may have separate data strobe signals for read and write operations. Physical interface 214 may also include circuitry (not shown here) for adjusting various I/O settings associated with the transmission of signals to and reception of signals from memory. This may include circuitry for adjusting the drive strength of signals, controlling the impedances and/or termination of signal lines, and so on.

It is noted that in various embodiments, additional signal paths may be coupled to physical interface 214. These signal paths may include paths to convey write enable signals, read enable signals, address signals, and so on, from memory controller 205 to a correspondingly coupled memory. Similarly, physical interface 214 may include circuitry for generating these signals, and may include additional circuits for receiving signals. These additional signal paths and circuits are omitted here for the sake of simplicity, although their absence in the drawing is not intended to limit the disclosure in any way.

During read operations, transceiver 220 may receive signals conveyed from the memory via the signal paths DQ[N-1:0]. Transceiver 220 may also interpret the received signals using a reference voltage value (e.g., generated by a reference voltage generator circuit, not shown here). The reference voltage may be set by eye calculator 211, via the ReadV signal path. Using the reference voltage, transceiver 220 may determine whether individual ones of the received data signals are to be interpreted as a logic 0 or a logic 1. During normal operations, the output of transceiver 220, when operating to receive data from memory, is the DQ_Out signal path, with the data being conveyed to other units (e.g., to a requesting agent such as a processor core).

Delay circuit 230 in the embodiment shown is coupled to receive an input clock signal, Clk_In, provided from a source external to memory controller 205. Although not explicitly shown, delay circuit 230 may include one or more delay locked loops (DLLs) or other type of delay circuitry. Delay may be applied to the input clock signal to generate a data strobe signal, DQS, which is used to synchronize the transfer of other signals (e.g., DQ[N-1:0]) between a memory and memory controller 205. The amount of delay applied may be based on a delay control signal, Dly_Ctl, provided by eye calculator 211 in calibration control circuit 206. In addition to conveying the data strobe signal to the memory, delay circuit 230 in the embodiment shown is also coupled to provide a clock signal to transceiver 220.

Calibration operations may include varying the reference voltage and an amount of delay applied to the data strobe signal. Horizontal calibrations may include varying the delay over a number of different values at a particular reference voltage. A vertical calibration may include performing a number of horizontal calibrations at different reference voltage values. At each combination of a delay and a reference voltage, data may be read from memory and compared to expected values by data comparator 218 in order to determine if any bit fails occur. A bit fail may be defined herein as a bit corresponding to a signal conveyed on a particular signal path of the data bus not matching its expected value (e.g., the bit is read as a logic 0 when a logic 1 is expected). In some embodiments, the data that is compared may be received by data comparator 218 via the DQ_In input, and thus the corresponding calibration operations may include the writing of this data to memory. The calibrations may determine an eye diagram indicating a range of voltages and delay values (as applied to the data strobe DQS) at which data may be correctly read from or written to memory.

Bit fails may be reported to eye calculator circuit 211. Responsive to receiving information of a bit fail, eye calculation circuit 211 may record the failing bit along with the reference voltage value and the delay value. Based on the data from failing bits and corresponding reference voltage and delay values, eye calculation circuit 211 may calculate an eye pattern. In some embodiments, an eye pattern may be calculated for each bit position individually. Embodiments are also possible and contemplated wherein the eye is calculated based on, e.g., an average of the individual signal paths.

Some calibration operations may include a number of writes of data to memory in addition to a number of reads of data from memory. Over a number of iterations, eye calculator 211 may cause adjustments to both the delay used in generation of the data strobe signal (via the Dly_Ctl signal) and the voltage used to distinguish between a logic 1 and a logic 0. Performing these operations for a number of different delay and reference voltage values may be used to define the eye pattern for the calibrated signal paths. An example eye pattern is shown in FIG. 2, with its height H defined along the vertical, voltage axis V, while the width W is defined along the time axis T. The voltage axis represents values of the reference voltage, while the time axis represents delay values applied to the data strobe signal by delay circuit 230. Values within the boundaries indicated in the drawing, defined in part by the height and width of the eye pattern, indicate areas where data bits conveyed in a signal can be correctly interpreted as a logic 1 or a logic 0. The areas toward the center of the eye pattern generally have a larger amount of timing margin and voltage margin than those located toward the boundaries.

While the calibrations discussed above are performed for determining points at which data conveyed on the data bus DQ[N−1:0] may be interpreted, other calibrations may also be performed for other signals, such as address signals and control signals conveyed between memory controller 205 and a correspondingly coupled memory.

State machine 210 in the embodiment shown is configured to coordinate the calibration operations. Responsive to receiving a calibration signal (Cal) from either within another portion of memory controller 205 or from an external source, state machine 210 may commence calibration operations. Assertion of the calibration signal may be performed in conjunction with a system startup, upon an exit from a sleep state, at periodic intervals, and in response to changes in a performance state, among other conditions. During calibration operations, state machine 210 may communicate with eye calculator 211, data comparator 218, and transceiver 220. Among the functions that state machine 210 may perform is issuing commands to transmit data for write operations, to cause memory controller 205 to read data from memory, and to cause a change to the delay and read voltage values. Upon completing a given calibration, eye calculator 211 may store the determined reference voltage and delay values. These values may then be used to set the reference voltage and delay values for normal (e.g., non-calibration) operations.

State machine 210 may also cause calculations to be performed in different performance states. As noted above, a performance state is defined herein as a unique combination of an operating voltage and clock frequency. Accordingly, calibrations may be carried out, under the direction of state machine 210, for each of a number of different values of Vdd and Clk_In frequencies that correspond to different performance states.

In the embodiment shown, state machine 210 in the embodiment shown is coupled to receive a E_Avail signal indicative of an amount of energy available to memory controller and/or the computing system in which it is implemented. In some embodiments, this signal may correspond to the C_detect signal shown in the embodiment of FIG. 1A, corresponding to the charge state of a battery of a portable device. Modifications to various memory calibrations may be carried out depending on the indicated amount of available energy. If the available energy is above a certain amount, calibrations may be carried out with their full, intended resolution and in any desired sequence and/or timing. However, if the amount of available energy is indicated as being below some particular value, state machine 210 may modify the calibrations in a manner to reduce their energy consumption and thus be performed under some specified energy limit. Such modifications may include changing the resolution of a calibration by, e.g., increasing a calibration step size and/or reducing a number of bits involved in the calibration. Other modifications may include delaying an onset of a calibration and/or performing calibrations in segments with delays between the segments. Another possible modification may include performing the calibrations in a particular order of calibrations such that those that consume less energy occur before others, e.g., to allow a battery more time to charge. In general, state machine 210 may perform any desired modification to a calibration that enables it to be sufficiently performed within an energy budget as prescribed by some specified limit and an amount of available energy.

While it is noted that state machine 210 is disclosed here as performing the various calibration modifications, embodiments of a memory controller 205 that include other types of control circuitry to carry out the functions of calibration modification based on an energy budget are also possible and contemplated. Such circuits may determine when and how a calibration should be modified and relay this information to state machine 210 (e.g., as commands) to carry out the calibration as indicated.

Figure 3:
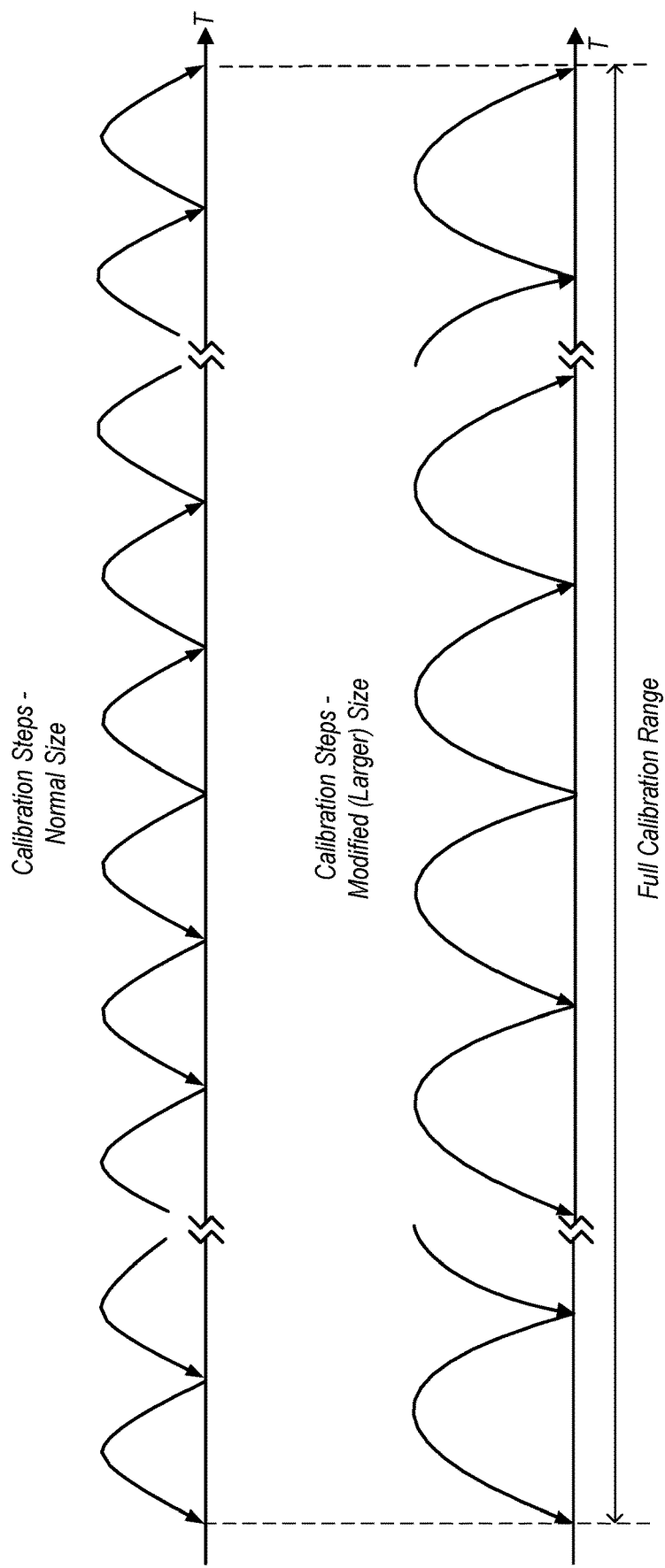
FIG. 3 is a diagram illustrating a modification of a calibration step size in one embodiment of a memory subsystem.

Graphic Illustration of Various Aspects of Memory Calibration Embodiments:

FIG. 3 is a diagram illustrating a modification of a calibration step size in one embodiment of a memory subsystem. In example shown, a contrast is presented between a normal step size calibration and that of a modified calibration. In the upper portion of the drawing, an example step size for a normal calibration performed over a full calibration range (e.g., range of delay values, as applied to a data strobe) is shown. This calibration may be performed when there are no extra energy limits set on the computing device, e.g., such as a portable computing device with a fully charged battery.

In the lower portion of the drawing, an example step size for a modified calibration is shown. In this example, the calibration is also performed over the fully calibration range. However, in this example, the step sizes are larger, thereby enabling the modified calibration to be performed in fewer steps and thus in less time. This may allow the calibration to be performed with a lower energy consumption relative to the normal calibration, albeit with a lower resolution. This resolution may nevertheless be deemed sufficient to arrive at calibrated parameters and to subsequently operate until such later time when energy is sufficient to perform a normal calibration with the corresponding step size, and thus at a higher resolution.

Figure 4:
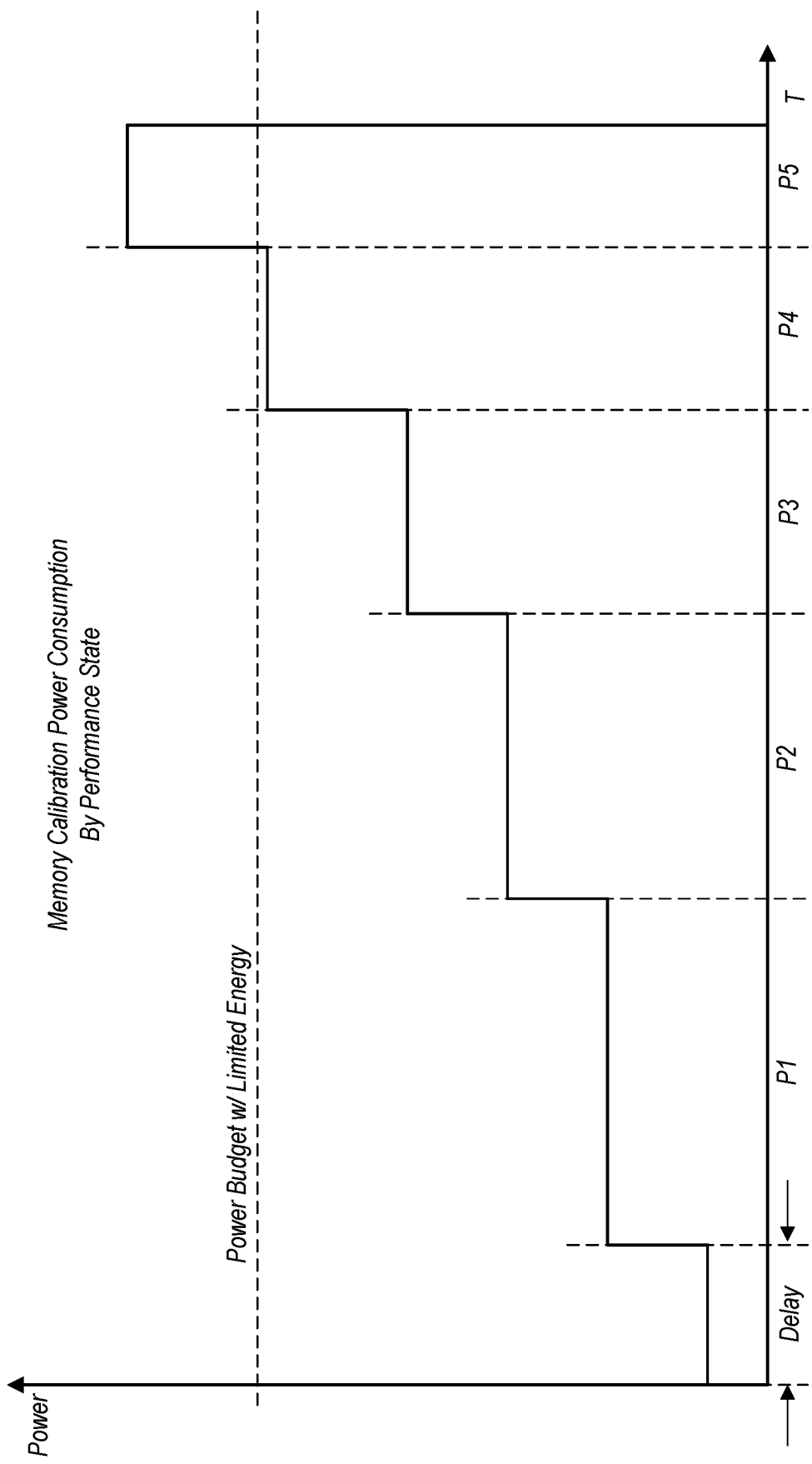
FIG. 4 is a diagram illustrating power consumption by calibrations performed in various performance states in one embodiment of a memory subsystem.

FIG. 4 is a diagram illustrating power consumption by calibrations performed in various performance states in one embodiment of a memory subsystem. In this example, the power consumption by various memory calibrations in different performance states is shown, relative to an energy budget.

The vertical axis of the graph is representative of power, while the horizontal graph is representative of time. The performances states P1-P5 each have a successively higher clock frequency (e.g., frequency, P2>frequency, P1), and may also have successively higher operating voltages. Accordingly, power in performance state P1 may be consumed at a lower rate than in performance state P2, and so on. In performance state P5, the power consumption exceeds a power budget as indicated by the dashed lines. In some scenarios, such as the cold boot scenario discussed above, the exceeding of the power budget by a calibration in a particular performance state may cause a brownout and thus the restarting of the boot procedure. However, various modifications to the calibrations may be carried out to reduce the power usage and thus allow the calibration to be performed within the limits set by the power budget.

One mitigation, as shown in the drawing, is to delay the onset of a calibration. In this example, the calibration performed in P1 is delayed. In a computing device having a battery that is charging from external power, this may allow for more charging time. Although not explicitly shown, delays can also be implemented between the calibrations in the different performance states to allow additional charging time without power consumption from calibration operations. Calibrations may also be modified with regard to their resolution to reduce power consumption. For example, the calibration performed in P5 may be modified by increasing its step size and/or reducing the number of bits involved in the calibration, and in some instances, this may reduce its power consumption to be under the power budget. Furthermore, the ordering of the calibrations as shown here, with calibrations being carried out in the lower performance states first, may allow for additional battery charging time in embodiments that utilize a battery. Power consumption may also be reduced by performing a calibration in segments with delays there between, where each segment corresponds to a portion the calibration.

Method Embodiments

Figure 5:
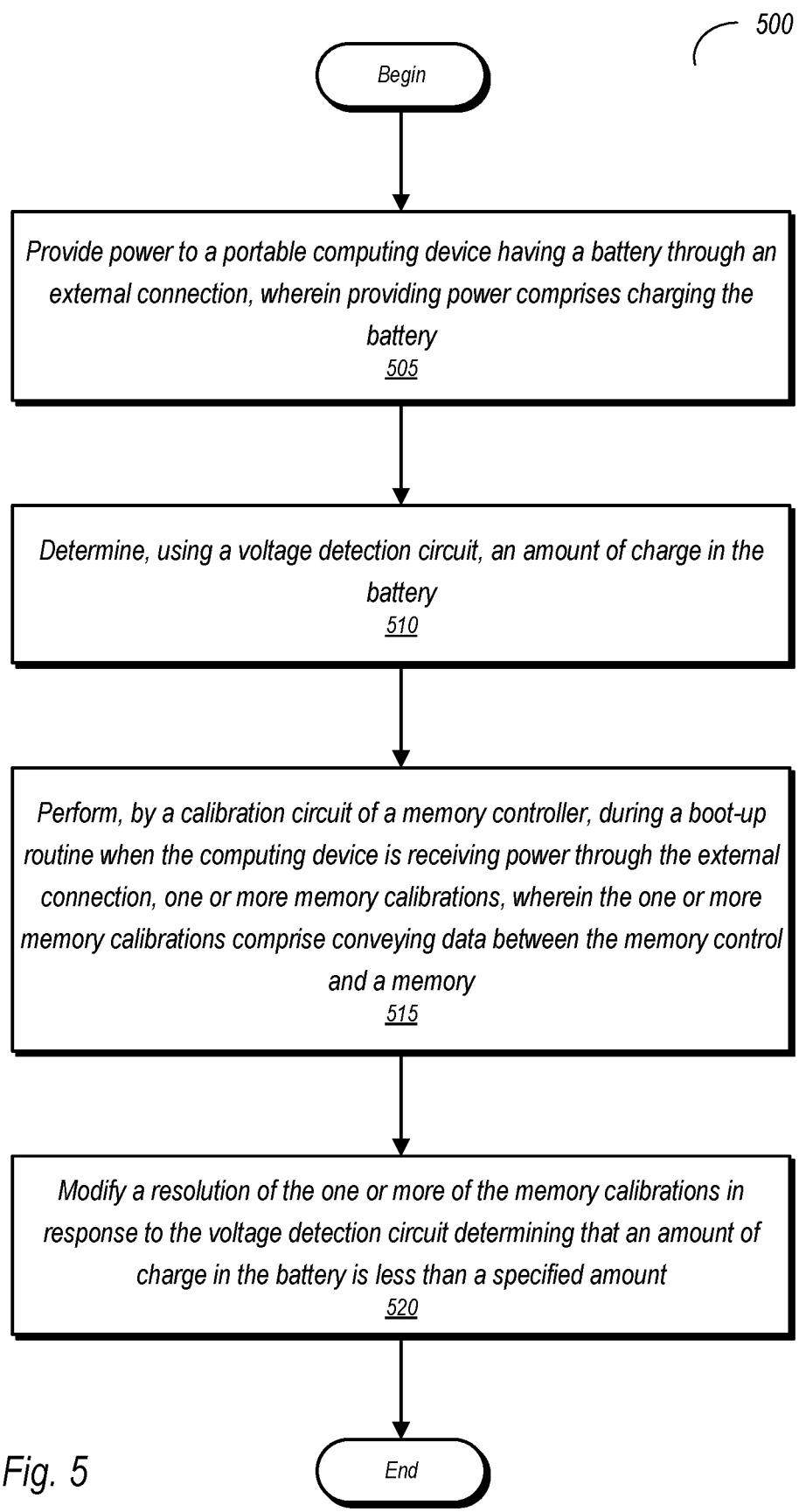
FIG. 5 is a flow diagram illustrating one embodiment of a method for modifying a memory calibration during a limited power scenario.

FIG. 5 is a flow diagram of one embodiment of a method for modifying a memory calibration during a limited power scenario. Method 500 may be carried out by various ones of the apparatus embodiments discussed above. Furthermore, apparatus embodiments capable of carrying out Method 500, but not otherwise disclosed herein, are considered to fall within the scope of this disclosure.

Method 500 includes providing power to a portable computing device having a battery through an external connection, wherein providing power comprises charging the battery (block 505). The method further includes determining, using a charge detection circuit, a charge state of the battery (block 510). Additionally, the method includes performing, by a calibration circuit of a memory controller, during a boot-up routine when the computing device is receiving power through the external connection, one or more memory calibrations, wherein the one or more memory calibrations comprise conveying data between the memory control and a memory (block 515), and modifying a resolution of the one or more of the memory calibrations in response to the charge detection circuit determining that a charge state of the battery is less than a specified amount.

In various embodiments, modifying the one or more memory calibrations comprises increasing a calibration step size. Modifying the one or more memory calibrations may also include delaying an onset of one or more of the memory calibrations until the battery has been charged to a specified level. In some embodiments, modifying the one or more memory calibrations comprises performing a calibration using a lower number of bits with respect to a number of bits of a full calibration. Modifying the one or more memory calibrations may also include performing a calibration in a plurality of segments with a delay period between successive segments. It is noted that these various modifications, as well as others not explicitly disclosed herein, are not mutually exclusive of one another. On the contrary, multiple ones of the various calibration modifications may be combined to perform a calibration within specified limits indicative of an energy budget.

In various embodiments, a computing device that includes the memory and the memory controller may be capable of operating in a number of different performance states. Accordingly, embodiments of the method may include performing calibrations for a plurality of performance states during the boot-up routine, and wherein modifying the one or more calibrations includes performing calibrations in performance states that consume a lower amount of power prior to those that consume a greater amount of power.

Figure 6:
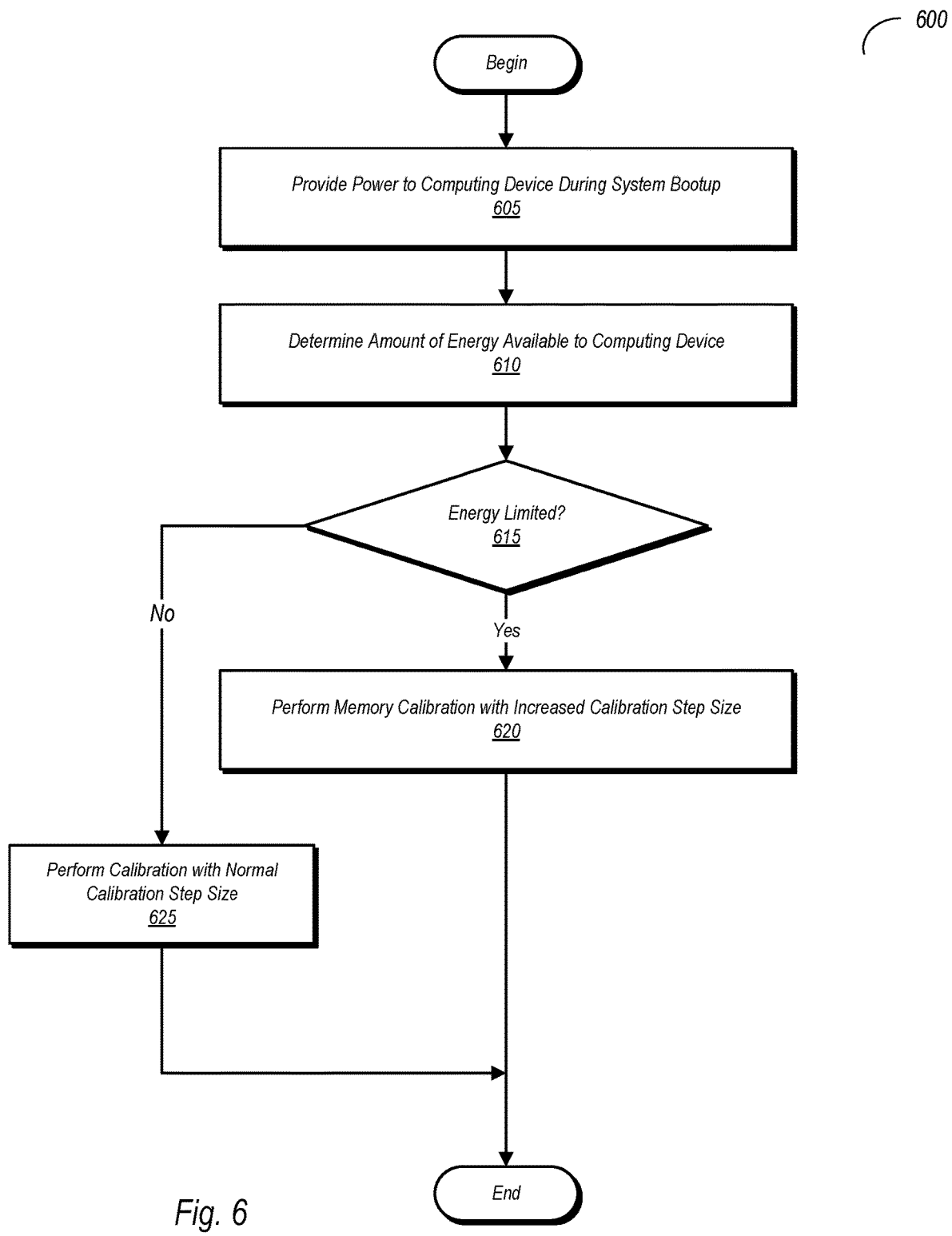
FIG. 6 is a flow diagram illustrating one embodiment of a method for modifying a memory calibration during a limited power scenario.

FIG. 6 is a flow diagram illustrating one embodiment of a method for modifying a memory calibration during a limited power scenario. Method 600 may be performed by various ones of the apparatus embodiments disclosed herein, such as the computing systems shown in FIGS. 1A and 1B. Embodiments of an apparatus capable of carrying out Method 600, but not otherwise disclosed herein, are also considered to fall within the scope of this disclosure.

Method 600 includes providing power to a computing device during a system bootup procedure (block 605), and determining an amount of energy available to the computing device (block 610). The amount of energy may vary from time to time. For example, if the computing device is a portable computing device with a battery that is substantially discharged, with the device operating on external power, the energy supply may be limited operating using an external power source, the energy supply may be limited operating on external power, the energy supply may be limited. In particular, the external power supply may be such that only a limited amount of energy, some of which may be used to charge the battery. Other limited energy scenarios are also possible and contemplated.

During the bootup procedure, a calibration may be carried out in a memory subsystem including a memory and a memory controller. If the available energy is limited (block 615, yes), then the calibration may be modified by increasing the calibration step size (block 620). This type of modification changes the resolution of the calibration, and may allow it to be completed in fewer steps. By completing the calibration in fewer steps, energy can be conserved, while the calibration can be conducted within an energy budget. This can prevent problems such as brownouts that could occur if the calibration exceeded the energy budget. While the resolution of the calibration may be less than that used in a non-energy-limited situation, it may nevertheless be sufficient to allow the computing system to begin operations.

If the energy is not indicated as being limited (block 615, no), such as in a scenario where a portable computing device is rebooted with a fully charged battery, the calibration may be performed using a normal step size (block 625). Calibrating with the normal step size may consume more energy, although without causing issues that may arise in a limited energy scenario. Furthermore, with a normal step size, the calibration may have a greater resolution. Calibrations using the normal step size may be performed periodically and at other times (e.g., in response to a performance state change) in situations where there are no constraints due to limited energy. For example, in a scenario following a cold boot in a portable computing device, calibrations using the normal step size may be performed once the battery is sufficiently charged.

Figure 7:
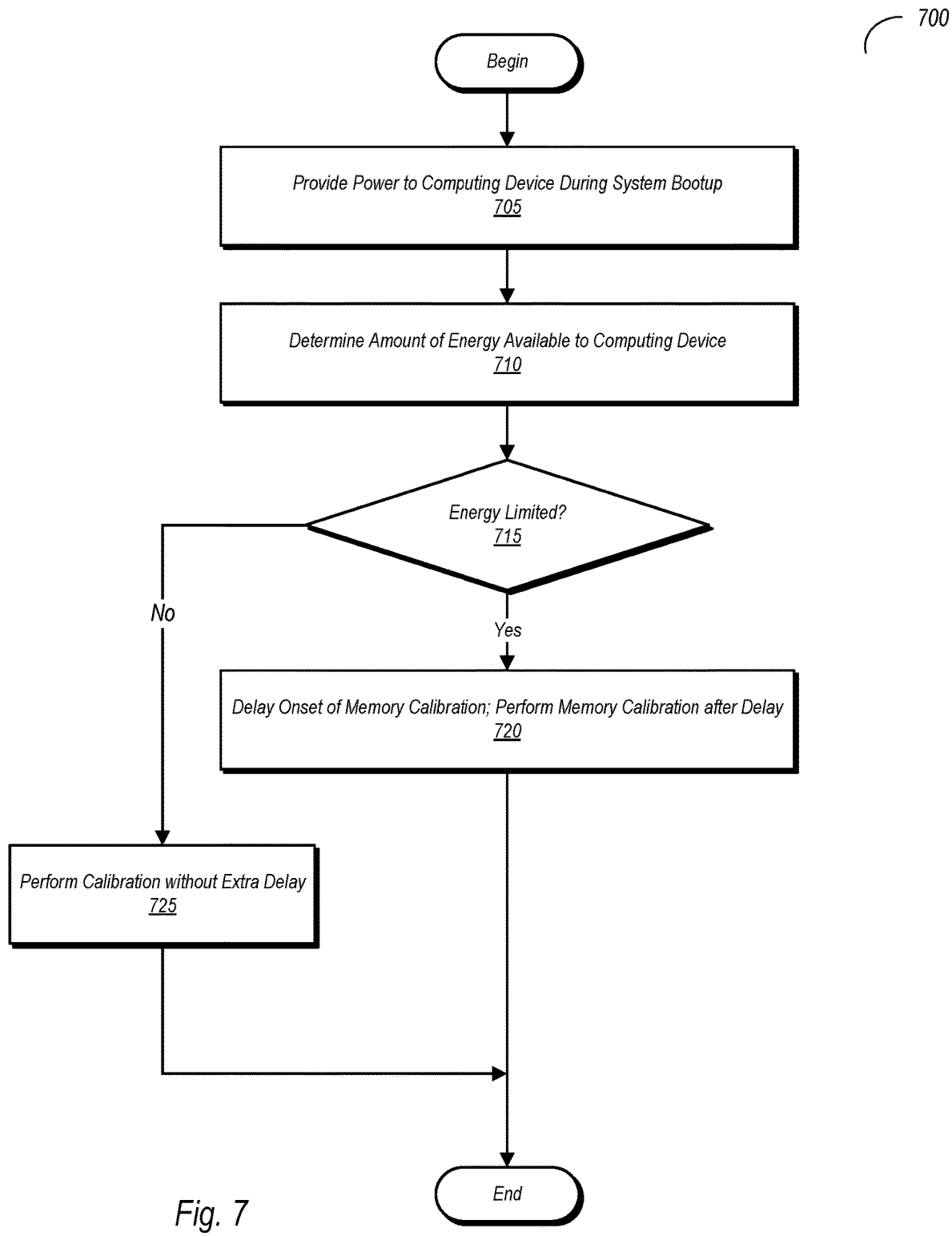
FIG. 7 is a flow diagram illustrating one embodiment of a method for modifying a memory calibration during a limited power scenario.

FIG. 7 is a flow diagram illustrating one embodiment of a method for modifying a memory calibration during a limited power scenario. Method 700 may be performed by various ones of the apparatus embodiments disclosed herein, such as the computing systems shown in FIGS. 1A and 1B. Embodiments of an apparatus capable of carrying out Method 700, but not otherwise disclosed herein, are also considered to fall within the scope of this disclosure.

Method 700 includes providing power to a computing device during a system bootup (block 705) and determining an amount of energy available to the computing device (block 710). As noted elsewhere, the energy may be limited in some situations, such as during a cold boot in a portable computing device when a battery thereof is substantially discharged. Determination of whether the energy is limited may be carried out by an energy detection circuit. For example, a level of charge may be determined by detecting a voltage across a battery, which has a higher voltage when fully charged relative to a state where it is discharged.

If it is determined that the available energy is limited (block 715, yes), a memory controller (or circuit therein) may delay an onset of a memory calibration, performing the calibration after the delay has expired (block 720). Delaying the calibration may allow for, e.g., the battery of a portable computing device to charge. Thus, the calibration can be conducted when energy is less limited. In situations such as a cold boot, allowing the battery additional time to charge may prevent brownouts.

If the energy is at a level that is not considered limited (block 715, no), then the calibration may be performed without any extra delay (block 725). This may occur in situations where the battery is sufficiently charged that the calibration can be carried out without causing problems such as the brownouts mentioned above. Such situations may include periodic calibration or calibrations performed in response to a performance state change during operations in which the computing device is carrying out its intended functions (e.g., normal operations).

Figure 8:
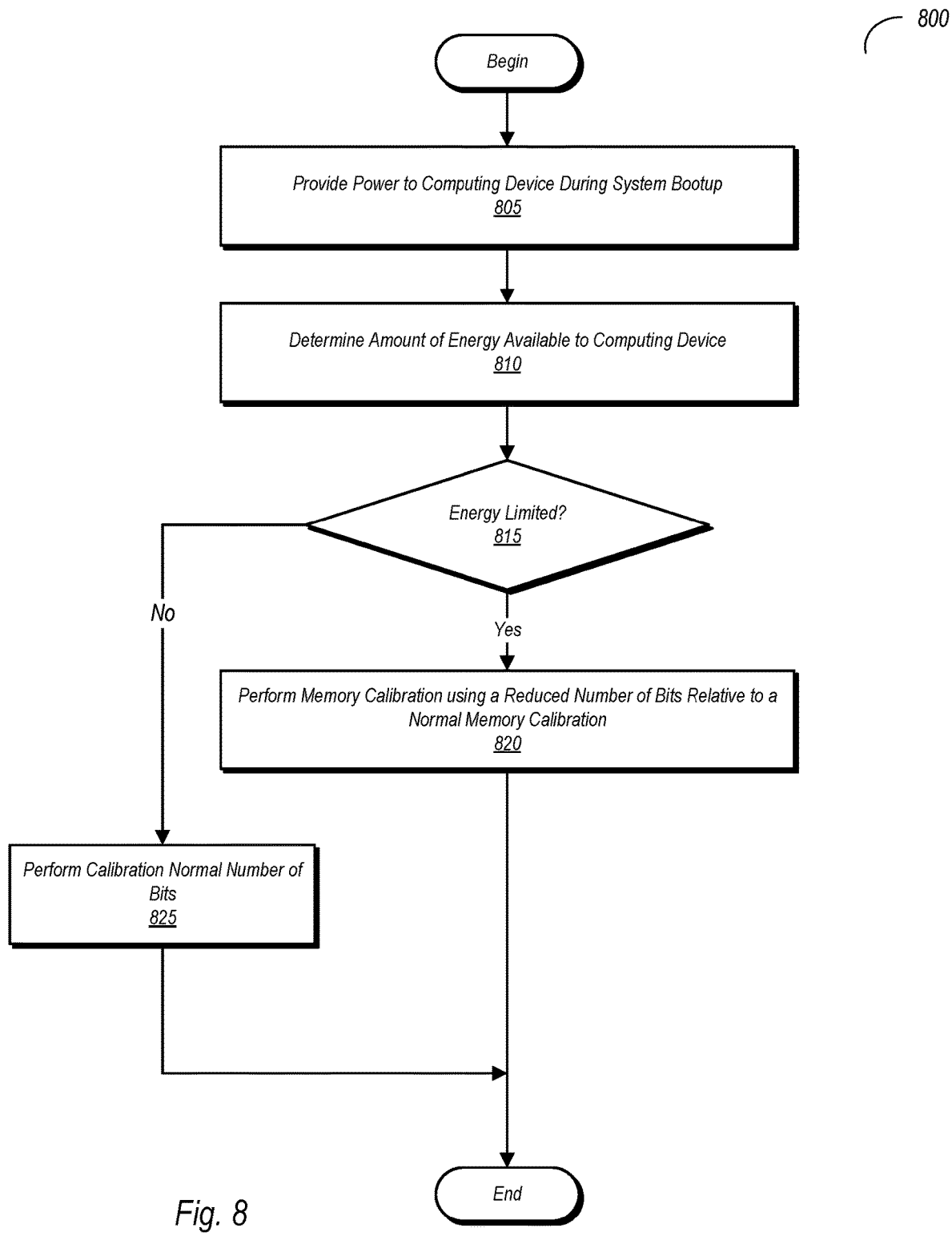
FIG. 8 is a flow diagram illustrating one embodiment of a method for modifying a memory calibration during a limited power scenario.

FIG. 8 is a flow diagram illustrating one embodiment of a method for modifying a memory calibration during a limited power scenario. Method 800 may be performed by various ones of the apparatus embodiments disclosed herein, such as the computing systems shown in FIGS. 1A and 1B. Embodiments of an apparatus capable of carrying out Method 800, but not otherwise disclosed herein, are also considered to fall within the scope of this disclosure.

Method 800 begins during a bootup procedure with power being applied by some energy source (block 805). The energy source may be battery in a portable computing device, or power from a source external to the computing device. An energy detection circuit may determine an amount of energy available to the computing device (block 810). If the amount of energy is limited (block 815, yes), then a memory calibration that is performed during the bootup procedure may be performed with a reduced number of bits relative to a normal calibration (block 820). For example, a normal memory calibration may be performed using 128 bits, while a calibration with a reduced number of bits may be performed using, e.g., 16 bits, 32 bits, and so on. Using a lesser number of bits relative to the normal calibration may reduce the amount of energy consumed in carrying out the calibration. In using a lesser number of bits, the calibration may be completed in fewer passes relative to a calibration carried out in non-energy-limited situations.

If the energy is not indicated as being limited by the energy detection circuit (block 815, no), then the calibration may be performed using the full number of bits (block 825). This may occur when, e.g., the battery of a portable computing device has attained a charge state sufficient to carry out normal operations in the system, including those that occur in higher performance states. Calibrations using the full number of bits may be performed on a periodic basis during operation, or when there is a change in performance states.

Figure 9:
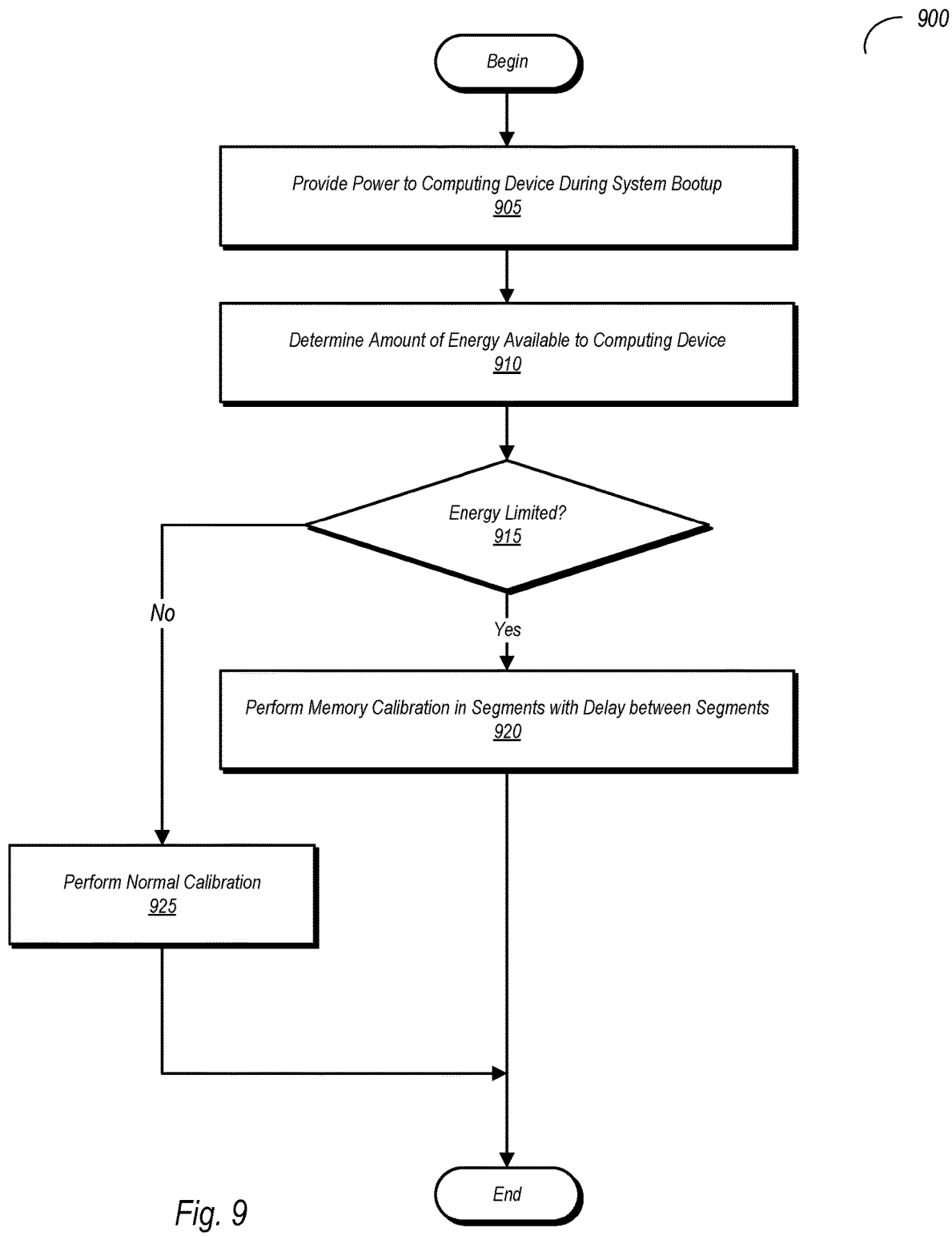
FIG. 9 is a flow diagram illustrating one embodiment of a method for modifying a memory calibration during a limited power scenario.

FIG. 9 is a flow diagram illustrating one embodiment of a method for modifying a memory calibration during a limited power scenario. Method 900 may be performed by various ones of the apparatus embodiments disclosed herein, such as the computing systems shown in FIGS. 1A and 1B. Embodiments of an apparatus capable of carrying out Method 900, but not otherwise disclosed herein, are also considered to fall within the scope of this disclosure.

Method 900 included providing power to a computing device during a bootup procedure. The method also includes determining (e.g., using an energy detection circuit), and amount of energy available to the computing device (block 910). If the computing system is operating with limited energy (block 915, yes), then a memory calibration carried out during the bootup procedure may be performed in segments (portions), with delays between the segments (block 920). The calibration may be considered complete when all segments have been performed. By performing the calibration in segments and adding delays there between, energy may be conserved, and additional time may be provided to, e.g., allow a battery of a portable computing device to continue charging without having to support memory calibration operations.

If the energy is not indicated as limited by an energy detection circuit (block 915, no), a normal calibration may be performed (block 925). In this particular example, the calibration is considered normal when it is not performed in segments having delays there between. Such calibrations may be performed in response to performance state changes, or periodically when operating in a particular performance state. Such calibrations may be completed fast without any substantial delay between segments.

In addition to the various methods illustrated by FIGS. 6-9, other method embodiments are also possible and contemplated. In one embodiment, calibration modifications may be performed for a multi-rank memory subsystem in which multiple memories (ranks) share a common memory bus. Delays may be inserted between calibrations of the various ranks to allow for, e.g., extra battery charge time without the energy consumption of the calibrations. When not in a situation where energy is limited below some particular value, calibrations may be performed without any substantial delay between a calibration of one rank and a calibration of another.

Another method may include performing calibrations in multi-channel memory subsystems. In such systems, when in a limited energy situation, calibrations may be performed for only a subset of the channels instead of the full complement. In addition, or alternatively thereto, delays may be inserted between calibrations performed in two different channels. In situations where energy is not limited below some particular value, calibrations may be performed for all channels of the memory subsystem without substantial delays there between.

Figure 10:
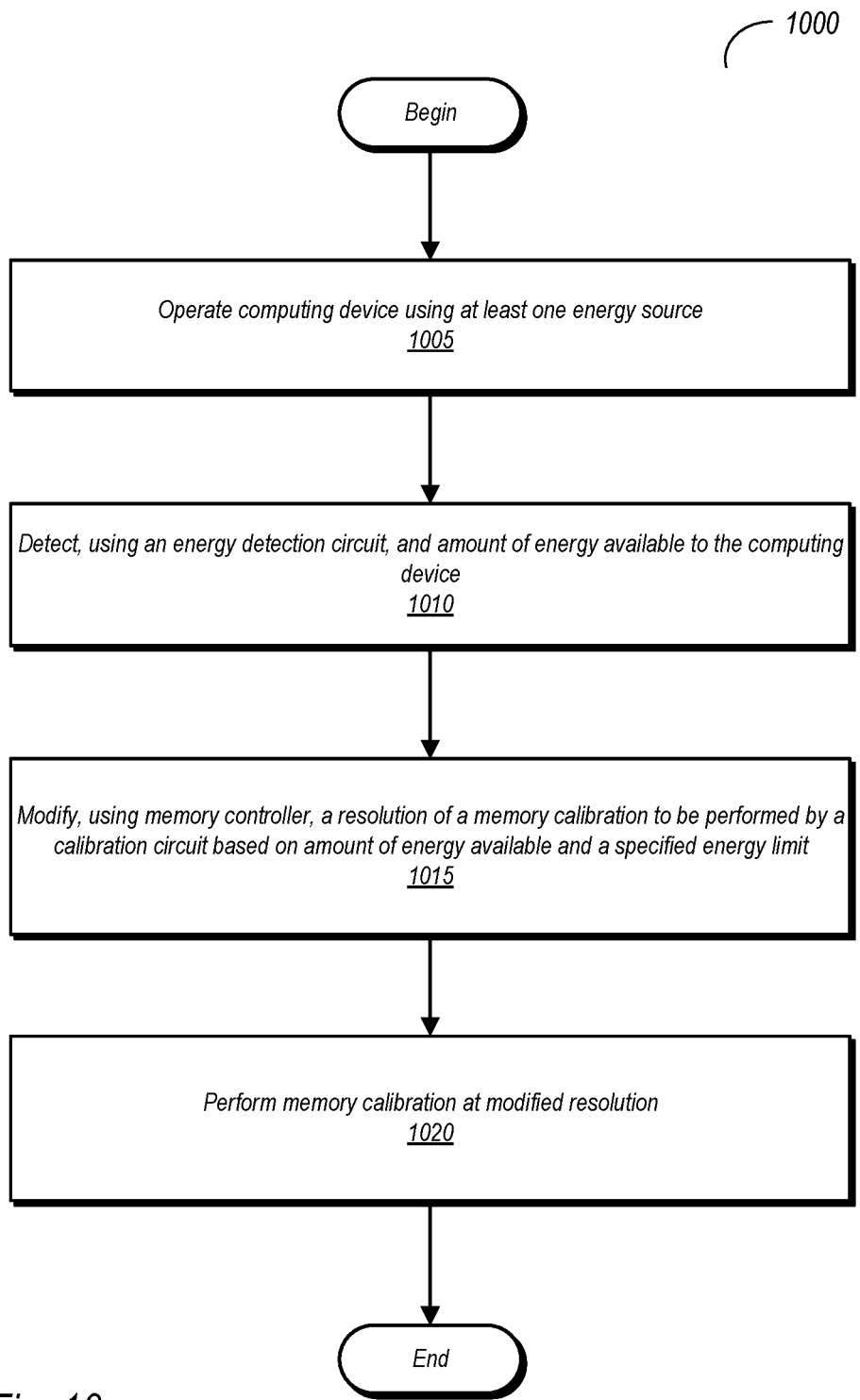
FIG. 10 is a flow diagram illustrating one embodiment of a method for modifying a memory calibration during a limited power scenario.

FIG. 10 is a flow diagram illustrating one embodiment of a method for modifying a memory calibration during a limited power scenario. Method 1000 may be performed by various ones of the apparatus embodiments disclosed herein, such as the computing systems shown in FIGS. 1A and 1B. Embodiments of an apparatus capable of carrying out Method 1000, but not otherwise disclosed herein, are also considered to fall within the scope of this disclosure.

Method 1000 included operating a computing device using at least one energy source (block 1005). The at least one energy source may include a battery of a portable computing device, and/or an external power source that is used to charge the battery. Generally speaking, the method contemplates any type of computing device operating using any suitable energy source.

Method 1000 further includes detecting, using an energy detection circuit, an amount of energy available to the computing device (block 1010). The energy detection circuit may be, for example, a voltage detection circuit that determines an amount of voltage across a battery, an amount of voltage provided from an external power source, or any other suitable circuitry that can be used to detect an amount of energy available to the computing device.

In some instances, the amount of available energy may be less than some specified value. For example, in a portable computing device in which the battery is substantially discharged, the primary energy source may be external power. The external power source may be limited in the amount of power it can deliver, with some of the delivered power being used to charge the battery. Accordingly, Method 1000 includes modifying, using a memory controller (or circuitry therein) a resolution of memory calibration to be carried out by a calibration circuit, with the modification being based on the amount of energy available and a specified energy limit (block 1015). The specified energy limit may be a value that is set based on an amount of the total available energy that can be used for performing the calibration while still being able to provide energy to other circuits in the computing device. The modifications may be any of the various calibration modifications discussed herein in which the resolution of the calibration is modified. Multiple methods of modifying a calibration resolution may be combined, and these methods may be combined with other energy saving methods that are not explicitly directed to modifying the resolution of the calibration. After determining which modifications are to be made, the calibration may be performed at the modified resolution (block 1020).

While the various methods discussed above may be carried out independently of one another, they are not considered to be mutually exclusive. The present disclosure contemplates carrying out various ones of the methods discussed above in combination with other ones of the methods. Generally speaking, any of the methods discussed above may be combined with any of the other methods, and any combination of two or more of these methods is possible and contemplated. Combining these methods in a suitable manner may result in additional power savings during calibration operations that may be performed during limited energy situations.

Example System

Figure 11:
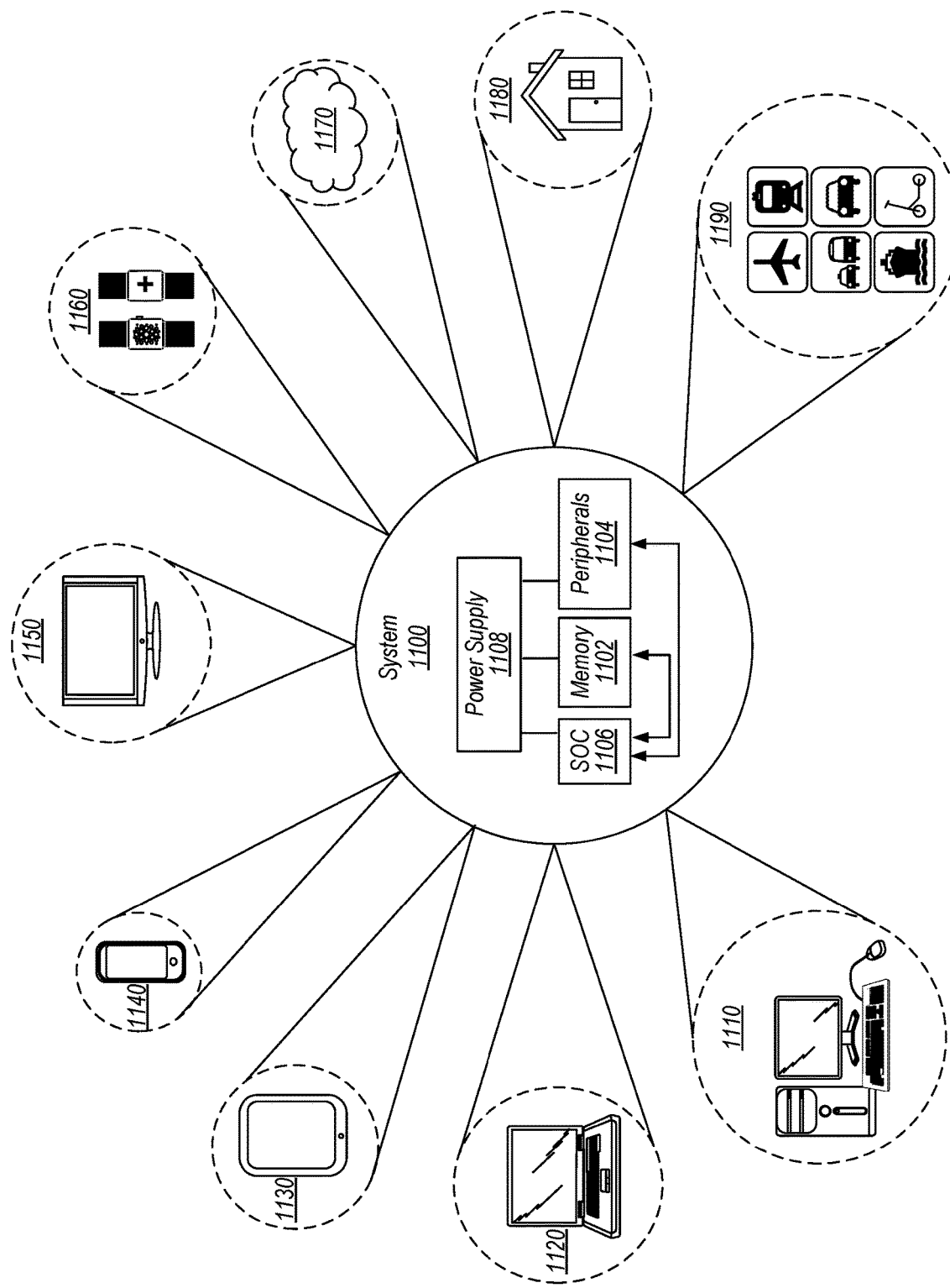
FIG. 11 is a block diagram of one embodiment of an example system.

Turning next to FIG. 11, a block diagram of one embodiment of a system 1100 is shown that may incorporate and/or otherwise utilize the methods and mechanisms described herein. In the illustrated embodiment, the system 1100 includes at least one instance of a system on chip (SoC) 1106 which may include multiple types of processing units, such as a central processing unit (CPU), a graphics processing unit (GPU), or otherwise, a communication fabric, and interfaces to memories and input/output devices. In some embodiments, one or more processors in SoC 1106 includes multiple execution lanes and an instruction issue queue. In various embodiments, SoC 1106 is coupled to external memory 1102, peripherals 1104, and power supply 1108.

A power supply 1108 is also provided which supplies the supply voltages to SoC 1106 as well as one or more supply voltages to the memory 1102 and/or the peripherals 1104. In various embodiments, power supply 1108 represents a battery (e.g., a rechargeable battery in a smart phone, laptop or tablet computer, or other device). In some embodiments, more than one instance of SoC 1106 is included (and more than one external memory 1102 is included as well).

The memory 1102 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 1106 in the embodiment shown may include at least one memory controller coupled to memory 1102, with the memory controller and the memory forming a memory subsystem. The memory controller may include a calibration circuit that carries out various memory calibrations in accordance with the discussion above. In situations wherein system 1100 is energy limited (e.g., during a cold boot using external power concurrent with charging a battery) these calibrations may be modified in various ways to limit their power consumption.

The peripherals 1104 include any desired circuitry, depending on the type of system 1100. For example, in one embodiment, peripherals 1104 includes devices for various types of wireless communication, such as Wi-Fi, Bluetooth, cellular, global positioning system, etc. In some embodiments, the peripherals 1104 also include additional storage, including RAM storage, solid state storage, or disk storage. The peripherals 1104 include user interface devices such as a display screen, including touch display screens or multi-touch display screens, keyboard or other input devices, microphones, speakers, etc.

As illustrated, system 1100 is shown to have application in a wide range of areas. For example, system 1100 may be utilized as part of the chips, circuitry, components, etc., of a desktop computer 1110, laptop computer 1120, tablet computer 1130, cellular or mobile phone 1140, or television 1150 (or set-top box coupled to a television). Also illustrated is a smartwatch and health monitoring device 1160. In some embodiments, smartwatch 1160 may include a variety of general-purpose computing related functions. For example, smartwatch 1160 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 1100 may further be used as part of a cloud-based service(s) 1170. For example, the previously mentioned devices, and/or other devices, may access computing resources in the cloud (i.e., remotely located hardware and/or software resources). Still further, system 1100 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 11 is the application of system 1100 to various modes of transportation. For example, system 1100 may be used in the control and/or entertainment systems of aircraft, trains, buses, cars for hire, private automobiles, waterborne vessels from private boats to cruise liners, scooters (for rent or owned), and so on. In various cases, system 1100 may be used to provide automated guidance (e.g., self-driving vehicles), general systems control, and otherwise. These any many other embodiments are possible and are contemplated. It is noted that the devices and applications illustrated in FIG. 11 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus comprising:
a portable computing device having a battery and configured to receive power through an external connection, wherein the portable computing device includes:
a charge detection circuit configured to determine a charge state of the battery;
a memory; and
a memory controller coupled to the memory via a memory interface, wherein the memory controller includes a calibration circuit configured to perform one or more calibrations of the memory during a boot-up routine of the portable computing device, and wherein to perform the one or more calibrations, the calibration circuit is further configured to perform calibration operations across a plurality of performance states;
wherein the memory controller is configured to, during the boot-up routine when the portable computing device is receiving power through the external connection and in response to the charge detection circuit determining that the charge state of the battery indicates less than a specified level, modify a manner of performing the calibration operations in one or more of the performance states, where to modify the manner, the memory controller is further configured to cause the calibration circuit to perform calibrations for lower performance states prior to performing calibrations for higher performance states.

2. The apparatus of claim 1, wherein the memory controller is configured to, in modifying the manner of performing the one or more of the calibrations of the memory, increase a calibration step size for at least one of the one or more calibration operations.

3. The apparatus of claim 1, wherein the memory controller is configured to, in modifying the manner of performing the one or more of the calibrations of the memory, delay an onset of the one or more of the calibrations of the memory.

4. The apparatus of claim 1, wherein the memory controller is configured to, in modifying the manner of performing the one or more of the calibrations of the memory, reduce a number of bits used to carry out at least one of the calibration operations.

5. The apparatus of claim 1, wherein the memory controller is configured to, in modifying the manner of performing the one or more of the calibrations of the memory, cause the calibration circuit to perform a calibration in segments with a delay period between the segments.

6. The apparatus of claim 1, wherein the memory is arranged in ranks with a plurality of ranks sharing a common data bus, and wherein the memory controller is configured to, in modifying the manner of performing the calibration operations, cause the calibration circuit to insert a delay between calibration of two or more ranks.

7. The apparatus of claim 1, wherein ones of the plurality of performance states are defined by respective combinations of a clock frequency and a supply voltage at which the memory and the memory controller operate.

8. The apparatus of claim 1, wherein the specified level for the charge state of the battery is based on a voltage output by the battery and an amount of power provided by a power source coupled to the external connection.

9. The apparatus of claim 1, wherein the calibration circuit is configured to determine, for a given one of the one or more calibrations of the memory, a range of delays provided to a data strobe signal, for various values of a reference voltage, at which valid data is read from the memory.

10. A method comprising:
providing power to a portable computing device having a battery through an external connection, wherein providing power comprises charging the battery;
determining, using a charge detection circuit, a charge state of the battery;
performing, by a calibration circuit of a memory controller, during a boot-up routine when the portable computing device is receiving power through the external connection, one or more calibrations of a memory coupled to the memory controller via a memory interface, wherein performing the one or more calibrations of the memory includes carrying out calibration operations across a plurality of performance states, and wherein the calibration operations comprise conveying data between the memory control and the memory; and modifying a manner of performing the calibration operations in one or more of the performance states in response to the charge detection circuit determining that the charge state of the battery indicates less than a specified level, wherein modifying the manner of performing the calibration operations includes performing calibrations for performance states that consume a lower amount of power prior to those for performance states that consume a greater amount of power.

11. The method of claim 10, wherein modifying the manner of performing the one or more calibrations of the memory comprises increasing a calibration step size for at least one of the calibration operations.

12. The method of claim 10, wherein modifying the manner of performing the one or more calibrations of the memory comprises delaying an onset of the one or more of the calibrations of the memory until the battery has been charged to the specified level.

13. The method of claim 10, wherein modifying the manner of performing the one or more calibrations of the memory comprises reducing a number of bits used to carry out a given calibration operation.

14. The method of claim 10, wherein modifying the manner of performing the one or more calibrations of the memory comprises performing a calibration in a plurality of segments with a delay period between successive segments.

15. The method of claim 10, further comprising determining, for a given one of the one or more calibrations of the memory, a range of delays provided to a data strobe signal, for various values of a reference voltage, at which valid data is read from the memory.

16. A system comprising:
a computing device configured to operate using energy provided from at least one energy source, wherein the computing device includes:
a memory; and
a memory controller coupled to the memory via a memory interface, wherein the memory controller includes a calibration circuit configured to perform a calibration of the memory, and wherein performing the calibration includes carrying out one or more calibration operations across a plurality of performance states; and an energy detection circuit configured to detect and indicate an amount of energy available to the computing device;

wherein the memory controller is configured to, based on the amount of energy available to the computing device and a specified energy limit, modify a manner of performing the calibration of the memory in one or more of the performance states such that the calibration consumes less energy than the specified energy limit, where to modify the manner, the memory controller is further configured to cause the calibration circuit to perform calibrations for lower performance states prior to performing calibrations for higher performance states.

17. The system of claim 16, wherein the memory controller is further configured to, based on the amount of energy available to the computing device and a specified power limit, modify the manner of performing the calibration of the memory such that the calibration consumes less power than the specified power limit.

18. The system of claim 16, wherein the computing device is configured to receive energy from an external energy source and at a battery internal to the computing device, and wherein the energy detection circuit is configured to detect and indicate a combined amount of energy available from the external energy source and the battery.

19. The system of claim 16, wherein the memory controller is configured to, in modifying the manner of performing the calibration of the memory, modify a resolution used in a given calibration operation.

20. The system of claim 19, wherein the memory controller is configured to, in modifying the resolution used in the given calibration operation, cause calibration circuit to perform the given calibration operation using a reduced number of bits or an increased calibration step size.

* * * * *